United States Patent [19]

Muir et al.

[11] Patent Number: 5,626,468

[45] Date of Patent: May 6, 1997

[54] SKID FOR COMPRESSOR

[75] Inventors: K. Douglas Muir; Randy V. Franiel; Rowan B. Walter, all of Calgary, Canada

[73] Assignee: Enterra Compression Company, Corpus Christi, Tex.

[21] Appl. No.: 437,395

[22] Filed: May 9, 1995

[51] Int. Cl.[6] .................................................. F16M 3/00
[52] U.S. Cl. ........................ 417/360; 248/639; 248/678
[58] Field of Search .................................. 417/360, 364; 248/639, 678, 670; 108/55.1, 54.1, 56.1

[56] References Cited

U.S. PATENT DOCUMENTS

| | | | |
|---|---|---|---|
| 1,204,544 | 2/1916 | Caverno | 248/639 |
| 1,887,862 | 2/1932 | Simmen | 248/639 |
| 2,296,184 | 9/1942 | Riise | 248/639 |
| 4,158,510 | 6/1979 | Smith et al. | 366/16 |
| 4,572,474 | 2/1986 | Derlich | 248/639 |
| 4,638,971 | 1/1987 | Basinsky et al. | 248/678 |

Primary Examiner—Edward K. Look
Assistant Examiner—Roland G. McAndrews, Jr.
Attorney, Agent, or Firm—Sidley & Austin

[57] ABSTRACT

A skid (10) is disclosed which includes a mainframe (22) and detachable side wings (22,24) which can be removed from the mainframe for transportation and attached to the mainframe at the site of use to enhance stability. The engine (14), compressor (12) and other equipment are mounted between the main beams (26, 28) of the mainframe (20) and suitable plates (136) are interdisposed between the main beams to allow a walkway between the engine and the compressor. Grating (156) is provided on other portions of the skid to facilitate use by operational personnel. All pipe runs beneath the grating and provisions are made for fluids to drain from the engine and compressor to storage tanks within the skid.

15 Claims, 3 Drawing Sheets

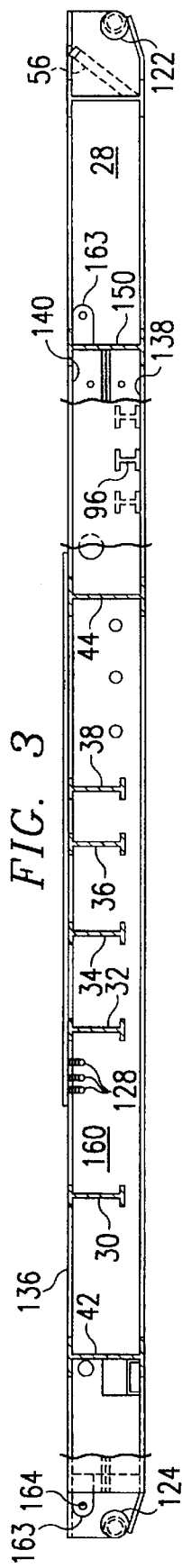
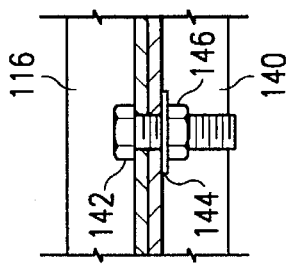
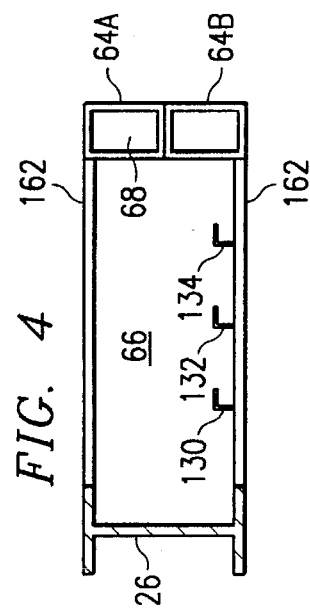
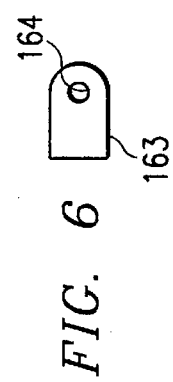
FIG. 3
FIG. 5
FIG. 4
FIG. 6

SKID FOR COMPRESSOR

TECHNICAL FIELD OF THE INVENTION

This invention relates to mounting of a reciprocating compressor and power source for use in a remote location.

BACKGROUND OF THE INVENTION

A frequent need arises for placing a reciprocating compressor and driving engine in a remote location. Over the years, a number of skids have been designed on which the compressor and engine are mounted. The skids and equipment mounted thereon are transportable by truck to the remote location. The skid is then positioned at the location and forms the base for the equipment.

To the extent possible, the skid should be self-contained and self-sustaining due to the remote location at which most skid units are installed. Further, the skid should be designed for ease of installation and maintenance for efficiency. Despite the use of a number of skid designs in the industry, a need still exists for an improved design which provides the desired characteristics noted above to the fullest extent possible.

SUMMARY OF THE INVENTION

In accordance with one aspect of the present invention, a compressor skid is provided which includes a mainframe having a width and a length for mounting a compressor and a power source. At least one side wing is attached to the mainframe to extend the width of the mainframe.

In accordance with another aspect of the present invention, the mainframe is made up of a plurality of longitudinal beams and lateral beams, each of the beams having an upper surface. An upper deck is attached to the upper surface of the beams in a center portion of the upper deck. Grating is attached to the upper surface of the beams on a first side portion and a second side portion on opposite sides of the center portion.

In accordance with another aspect of the present invention, at least one tank is mounted at the end of the mainframe for containing waste fluid. Structure is used to drain fluids from the engine directly to the waste fluid tank.

BRIEF DESCRIPTION OF THE DRAWINGS

For a more complete understanding of the present invention and for further advantages thereof, reference is now made to the following description of the preferred embodiment, taken in conjunction with the accompanying drawings, in which:

FIG. 3 is a side view in partial cross-section of the skid taken along line 3—3 in FIG. 2;

FIG. 4 is a detail cross-sectional view of the waste fluid tank;

FIG. 5 is a detail view of the bolted attachment between the mainframe and side wings; and FIG. 6 is a detail view of a lifting eye.

DETAILED DESCRIPTION

Figure 1:
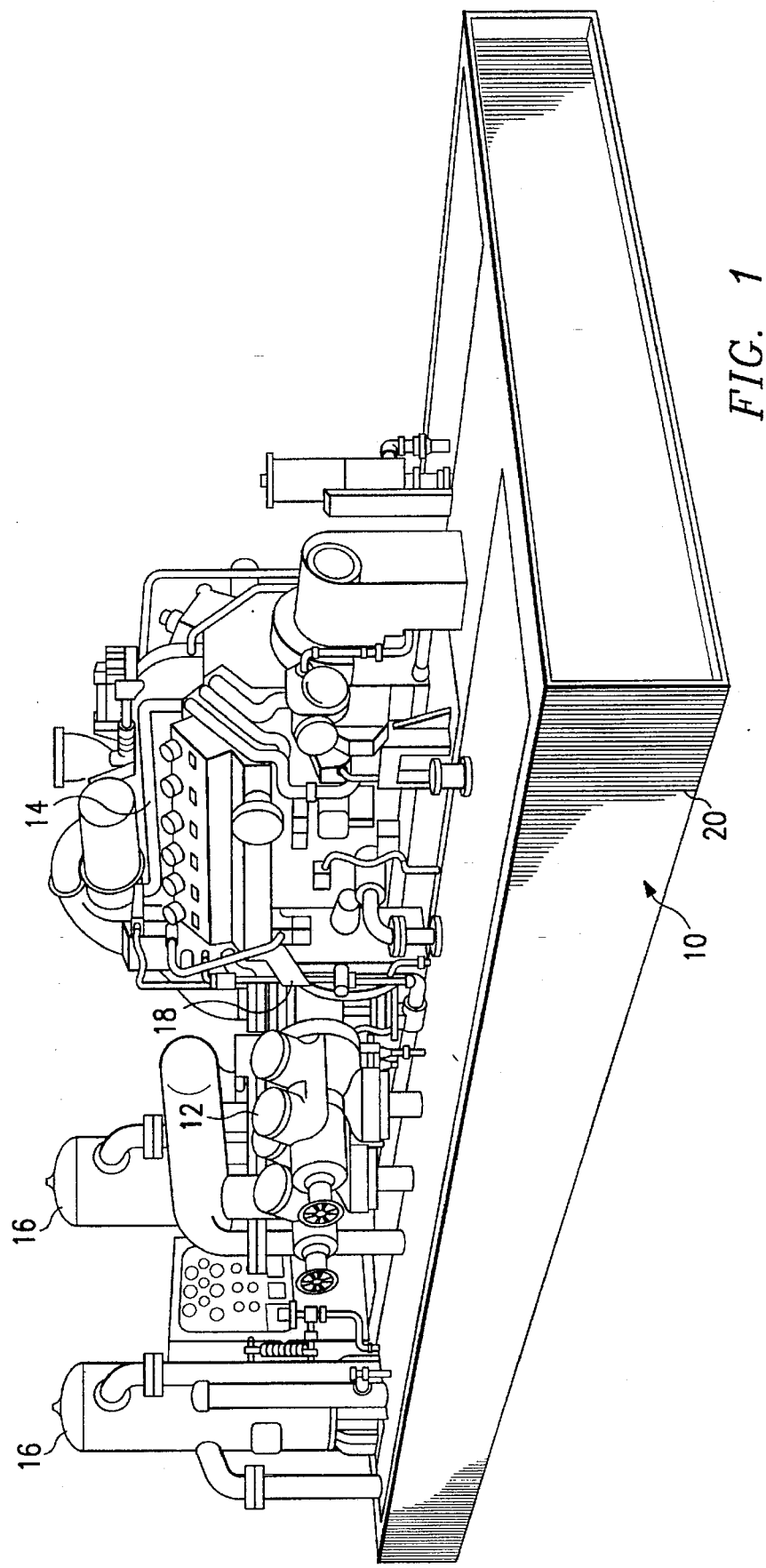
FIG. 1 is a perspective view of a skid forming a first embodiment of the present invention having a compressor and engine mounted thereon.
Figure 2:
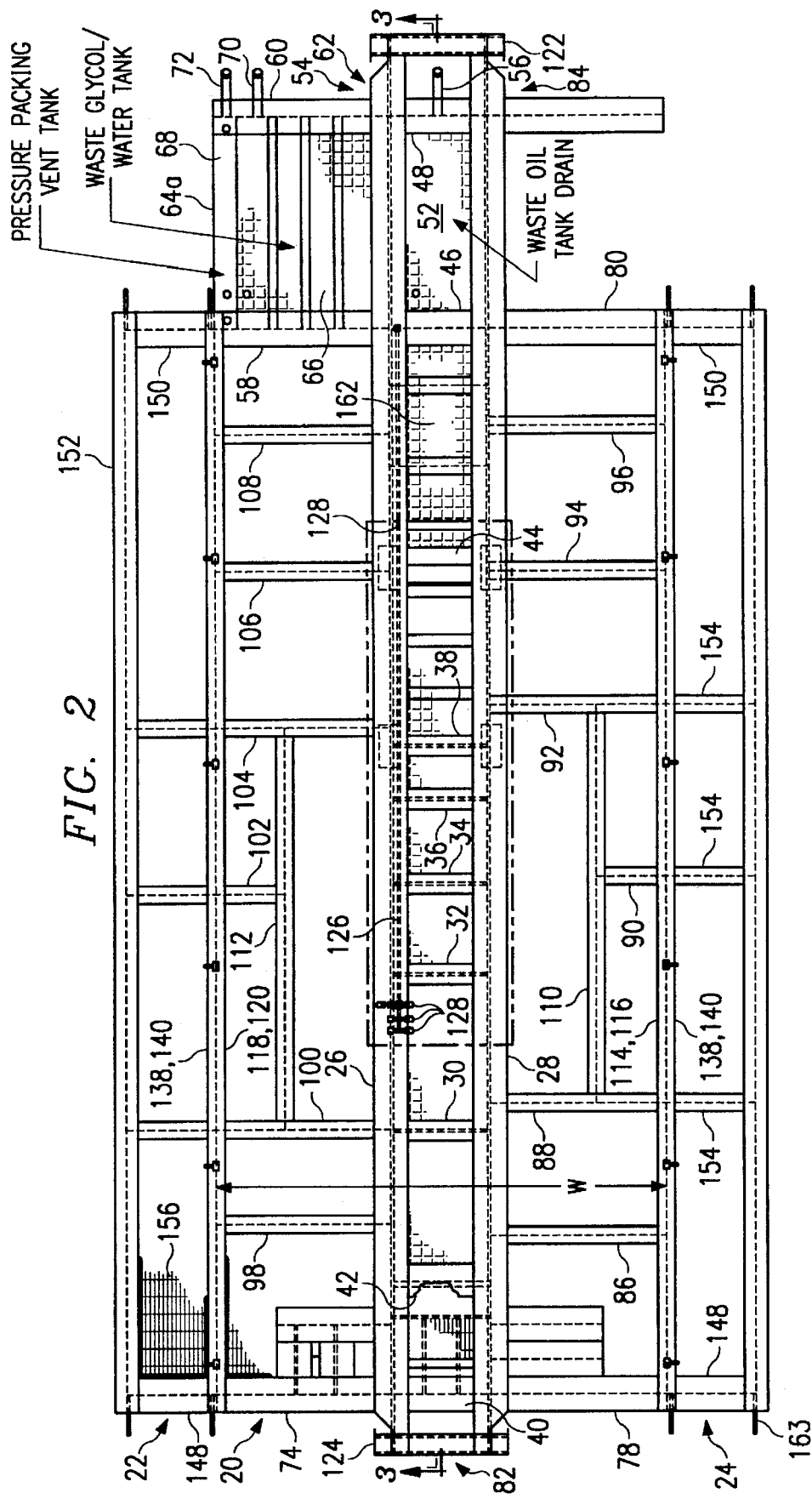
FIG. 2 is a plan view of the skid of FIG. 1.

With reference now to FIGS. 1 and 2, a skid 10 forming a first embodiment of the present invention is illustrated. The skid 10 is designed to mount a compressor 12, a power source, typically natural gas engine 14, a series of scrubbers 16, and a cooler (not shown) for cooling the engine and gas. As will be discussed subsequently, the skid 10 includes a mainframe 20 and first and second detachable side wings 22 and 24. This permits the mainframe 20 to have a width W which is the maximum permissible for trailering on the highway typically 14 feet. However, when side wings 22 and 24 are installed on site, the skid will be as wide as the combination of the width of the mainframe and the two side wings for enhanced stability and flexibility.

The mainframe includes a pair of longitudinal main beams 26 and 28 which are preferably about 24 inches high and have a length of approximately 43 feet. Lateral beams 30, 32, 34, 36, and 38 extend between the main beams 26 and 28 and are welded thereto. The lateral beams preferably have a height of about 18 inches to 24 inches depending on the weight of the equipment supported. The length of beams 30–38 vary depending on the footprint geometry of the compressor and engine. Generally, a three foot beam length is a minimum that would be used due to lifting stability when loading and off-loading the compressor package. The upper surface of beams 30–38 are flush with the upper surface of beams 26 and 28. Lateral beams 40, 42, 44, 46, and 48 also extend between the main beams 26 and 28, generally toward the ends of the beams, and preferably have a height of 24 inches and a length of about 3 feet. The upper surface of beams 40–48 are flush with the upper surface of beams 26 and 28. The lateral beams 46 and 48 and main beams 26 and 28 (with plates 162) form a waste oil tank drain 52 at the first end 54 of the skid 10. A drain spout 56 is mounted to and extends through a portion of lateral beam 48 to drain the tank.

Lateral beams 58 and 60 extend on a first side 62 of the mainframe 20 at the first end 54 and, along with a longitudinal element formed of two sections of 12 inch high rectangular tubing 64a and 64b (and plate 162), define a waste glycol-water tank 66 and a pressure packing vent tank 68. Drain spouts 70 and 72 enter the tanks 66 and 68, respectively. Lateral beams 58 and 60 are preferably 24 inches high.

Lateral beams 74, 58, 78 and 80 extend outwardly from each of the ends 54 and 82 on the first side 62 and the second side 84 at the corners of the skid. Each of beams 74, 58, 78 and 80 are preferably 24 inches high. From longitudinal main beam 28 extend a series of lateral beams 86–96. From main beam 26 extend a series of lateral beams 98–108. Longitudinal beam 110 interconnects lateral beams 88, 90 and 92 while longitudinal beam 112 connects lateral beams 100, 102 and 104. Each of the beams 86–112 are preferably 6 inches high with their bottom flange co-planar with the bottom flange of the main beams 26 and 28.

On the second side 84, a pair of channels 114 and 116 are welded one on top of the other and welded to lateral beams 86–96 and beams 78 and 80. A pair of channels 118 and 120 are welded one on top of the other and to the ends of lateral beams 98–108 and beams 74 and 58. The channels are preferably 12 inches wide.

pipes 122 and 124 are mounted between each of the main beams 26 and 28 at the first end 54 and the second end 82 to provide protection and a lifting point for the skid.

A waste oil discharge line 126 extends along main beam 26 from the waste oil tank 52 to a series of couplings 128 for draining waste engine oil from the engine 14 and the compressor 12.

As best seen in FIG. 4, a series of three angles 130, 132 and 134 are mounted to the bottom of the waste glycol-water tank 66 to provide for stiffening of the bottom tank plate when the tank is filled.

Between the main beam 26 and main beam 28, on the top and bottom surfaces thereof, are mounted plates 136, preferably having a thickness of ³⁄₁₆ inches. The plates are designed to fit about the compressor 12, engine 14, scrubber 16 and cooler mounted on the skid.

Each of the side wings 22 and 24 is made up of a longitudinal pair of channels 138 and 140 which are welded one atop the other. Side wings 22 and 24 are bolted to the longitudinal channels 114–120 of the mainframe by a series of bolts 142, washers 144 and nuts 146 as best seen in FIG. 5. Each of the channels preferably has a height of 12 inches to form a total height of 24 inches.

At the ends of the channels 138 and 140 extend lateral beams 148 and 150, preferably 24 inches high. Welded at the ends of the beams 148 and 150 is a longitudinal beam 152, preferably having a height of 24 inches. Between the beams 152 and channels 138 and 140 are welded a series of smaller lateral beams 154, preferably having a height of about 6 inches with their lower surface co-planar with the lower surface of the longitudinal beam 152 and channel 138.

Grating 156 is mounted between the lateral channels 114 and 120 and the main beams 26 and 28 on the mainframe and between the longitudinal beams 152 and channels 140 on the side wings 22 and 24 for the whole length of the skid with the top surface of the grating flush with the upper surface of the beams.

The volume between main beams 26 and 28 and between lateral beams 42 and 44 can be filled with concrete 160 to provide stability to the skid.

plates 163 can be welded at corners of the skid with holes 164 formed therethrough to form lifting eyes.

It will be noticed from FIG. 1 that generally all piping is run underneath the gratings or plates to provide an uncluttered appearance to the skid, which enhances the safety of operation and ease of maintenance. In association with this, the drain line 126 permits fluids to be drained from the engine and compressor directly into storage tanks, reducing the opportunity for oil and other slippery fluids to cover the top of the skid, forming a dangerous work surface. The use of the plating provides a walkway between the scrubbers 16 and the compressor 12 and between the engine 14 and the cooler 18 to provide easy maintenance. The compressor and the engine can either be bolted to the plates without the use of grout or the compressor can be grouted into the skid as desired. The jack shaft will be located under the grating with a low rotating center line to provide for a low center of gravity and maintenance accessibility to the front of the engine.

In one design constructed in accordance with the teachings of the present invention, the width W of the mainframe 20 is just under 14 feet. The width of the side wings 24 and 22 is about 3 feet. The total length of the skid is about 43 feet.

The skid can also have a weather enclosure to enclose all of the equipment and a bridge crane option, if desired.

The air cooler mounted on the skid will mount on the engine end of the skid above the drain tanks and is supported by the beams 46, 48, 58, 60, 61 and 80.

The length of the skid can vary from approximately 32 feet to 48 feet depending on the size of the engine, compressor and related equipment mounted on the skid.

An electric motor driven compressor is used instead of a natural gas driven compressor and an oil drain for the compressor is still provided. The oil lubrication system for a compressor is similar to that of an engine and oil must be changed on the compressor as well.

Although the present invention has been described with respect to a specific preferred embodiment thereof, various changes and modifications may be suggested to one skilled in the art, and it is intended this present invention encompass such changes and modifications as fall within the scope of the appended claims.

We claim:

1. A compressor skid for mounting a compressor and a power source, comprising:

a mainframe having a lateral width and a longitudinal length for mounting the compressor and power source;

first and second longitudinal main beams and a plurality of inner lateral beams extending between the longitudinal main beams, the compressor and power source mounted between the longitudinal main beams;

an upper deck plating mounted on the first and second longitudinal main beams between the compressor and power source; and at least one first side wing, the first side wing having a pair of elongate channels parallel to the first and second longitudinal main beams and a plurality of lateral beams interconnecting the elongate channels, wherein said first side wing is attached to the mainframe to extend the width of the mainframe.

2. The compressor skid of claim 1, wherein the mainframe further includes a plurality of outer lateral beams extending from the longitudinal main beams and first and second outer longitudinal beams, the first and second outer longitudinal beams mounted to the outer lateral beams, grating positioned between the longitudinal main beams and the longitudinal outer beams, the first side wing attached to the mainframe at one of said first and second outer longitudinal beams.

3. The compressor skid of claim 1, including concrete filling the volume between the longitudinal main beams.

4. The compressor skid of claim 1 wherein the mainframe width is suitable for transportation on the highway, the skid having a combined width with the first side wing attached to the mainframe, the combined width exceeding the width transportable on the highway.

5. The compressor skid of claim 1 wherein the mainframe further has pipes mounted at each end of the mainframe for protection and to provide a lifting point.

6. The compressor skid of claim 1, wherein the mainframe has at least one tank mounted therein to contain waste fluid.

7. The compressor skid of claim 6 wherein a portion of the mainframe forms part of the waste fluid tank.

8. The compressor skid of claim 6 further comprising stiffening elements mounted within the tank to provide stiffening for the tank.

9. The compressor skid of claim 6, further including a waste fluid line extending from the power source to the tank.

10. The compressor skid of claim 9 wherein the waste fluid line extends within the mainframe to the tank.

11. A compressor skid for mounting a compressor and a power source, comprising:

a main frame having a lateral width and a longitudinal length for mounting the compressor and power source, the main frame including first and second longitudinal main beams and a plurality of inner lateral beams extending between the longitudinal main beams, the compressor and power source mounted between the longitudinal main beams, and upper deck plating mounted on the first and second longitudinal main beams between the compressor and power source, the main frame further including a plurality of outer lateral beams extending from the longitudinal main beams and first and second outer longitudinal beams, the first and second outer longitudinal beams mounted to the outer lateral beams, grating positioned between the longitudinal main beams and the longitudinal outer beams;

a first side wing having a pair of elongate channels interconnected by a plurality of lateral beams, said first side wing removably attached to the first outer longitudinal beam;

a second side wing, the second side wing having a pair of elongate channels interconnected by a plurality of lateral beams, said second side wing removably attached to the second outer longitudinal beam;

the first and second side wings being removed from the main frame to permit the main frame to be transported on a highway, the first and second side wings attached to the main frame to increase the width of the compressor skid to enhance skid stability.

12. The compressor skid of claim 11 wherein the width of the main frame is about 14 feet.

13. The compressor skid of claim 11 wherein a waste fluid tank is formed within the main frame, portions of at least one of said longitudinal main beams and a plurality of said inner lateral beams or outer lateral beams forming a portion of the tank.

14. The compressor skid of claim 13 wherein the waste fluid tank further includes plates secured to selected ones of said longitudinal main beams and lateral beams forming a portion of the tank, stiffeners mounted on at least one of said plates to stiffen the plate.

15. The compressor skid of claim 13 further having a drain line extending within the main frame from the waste fluid tank to a position proximate the power source.

* * * * *